United States Patent [19]
Kisaka et al.

[11] Patent Number: 6,075,667
[45] Date of Patent: *Jun. 13, 2000

[54] METHOD AND APPARATUS FOR DETERMINING HEAD POSITIONING IN A MAGNETIC DISK DRIVE SYSTEM USING FIRST AND SECOND GRAY CODES

[75] Inventors: Masashi Kisaka; Yoshiro Amano, both of Yokohama, Japan

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/845,522

[22] Filed: Apr. 24, 1997

Related U.S. Application Data

[63] Continuation of application No. 08/531,997, Sep. 21, 1995, abandoned.

[30] Foreign Application Priority Data

Sep. 29, 1994 [JP] Japan ..................................... 6-235736

[51] Int. Cl.$^7$ ........................................................ G11B 5/09
[52] U.S. Cl. ............................................... 360/49; 360/48
[58] Field of Search ........................... 360/40, 49, 77.08, 360/78.14, 77.02, 74.1, 46, 53, 78.04; 369/44.26; 341/59; 395/438; 711/111

[56] References Cited

U.S. PATENT DOCUMENTS

| | | | |
|---|---|---|---|
| 3,789,138 | 1/1974 | Terada | 360/74.1 X |
| 4,032,984 | 6/1977 | Kaser et al. | 360/77.08 |
| 4,229,808 | 10/1980 | Hui | 360/48 X |
| 4,823,212 | 4/1989 | Knowles et al. | 360/77.08 |
| 4,977,472 | 12/1990 | Volz et al. | 360/78.14 |
| 4,984,901 | 1/1991 | Maury | 369/44.26 |
| 5,134,601 | 7/1992 | Greenwell et al. | 369/44.26 |
| 5,231,545 | 7/1993 | Gold | 360/49 |
| 5,274,510 | 12/1993 | Sugita et al. | 360/49 |
| 5,381,281 | 1/1995 | Shrinkle et al. | 360/77.08 |
| 5,506,735 | 4/1996 | Okazaki | 360/75 |
| 5,559,647 | 9/1996 | Kusano | 360/69 |

*Primary Examiner*—W. Chris Kim
*Attorney, Agent, or Firm*—Paik Saber

[57] ABSTRACT

A method and apparatus for positioning a head over a track in an information recording medium to eliminate head positioning error. Data tracks are concentrically formed on a magnetic disk, and identification information for identifying each data track is recorded so as to correspond to each data track. The identification information consists of first and second gray codes, and the first gray code is of n−1 bits where n represents the number of bits of a track address and set for each block so that it has a value different among a plurality of blocks each consisting of a plurality of data tracks. The second gray code is of three bits, and set for each data track so that it represents a value which differs between data tracks contiguous in the radial direction of the disk and circulates for every three or more blocks continuous in the radial direction of the disk. Head positioning is determined based on reading the first and second gray codes by the head.

4 Claims, 8 Drawing Sheets

| First gray code (n−2 bits) | Second gray code (4 bits) |
|---|---|
| 4(m − 1) + 3 | 1010 |
|  | 1011 |
|  | 1001 |
|  | 1000 |
| 4m | 0000 |
|  | 0001 |
|  | 0011 |
|  | 0010 |
| 4m + 1 | 0110 |
|  | 0111 |
|  | 0101 |
|  | 0100 |
| 4m + 2 | 1100 |
|  | 1101 |
|  | 1111 |
|  | 1110 |
| 4m + 3 | 1010 |
|  | 1011 |
|  | 1001 |
|  | 1000 |
| 4(m + 1) + 1 | 0000 |
|  | 0001 |
|  | 0011 |
|  | 0010 |

METHOD AND APPARATUS FOR DETERMINING HEAD POSITIONING IN A MAGNETIC DISK DRIVE SYSTEM USING FIRST AND SECOND GRAY CODES

This application is a continuation of Ser. No. 08/531,997, filed Sep. 21, 1995, now abandoned.

BACKGROUND OF THE INVENTION

1. Technical Field

The present invention is related to an information recording medium, a method for generating head positioning identification information, a method for determining head positioning in an information recording and reading apparatus, and, particularly, to an information recording medium shaped in the form of a disk and having recorded thereon identification information for determining head positioning, a method for generating head positioning identification information for generating said identification information, a method for determining head positioning when the information recording medium is rotated and the head is moved essentially in the radial direction of the disk, and an information recording and reading apparatus to which the method for determining head positioning is applicable.

2. Description of the Background Art

A plurality of data tracks is concentrically formed on a magnetic disk such as a hard disk or a flexible disk. Reading of information from or writing of information to the magnetic disk is performed after rotating the magnetic disk and moving a magnetic head essentially in the radial direction of the magnetic disk to position the magnetic head at a specific data track (a so-called seek operation). Positioning of the magnetic head at a specific data track is performed by respectively reading identification information and burst patterns which are prerecorded on the magnetic disk with the magnetic head, as described below.

Figure 8:
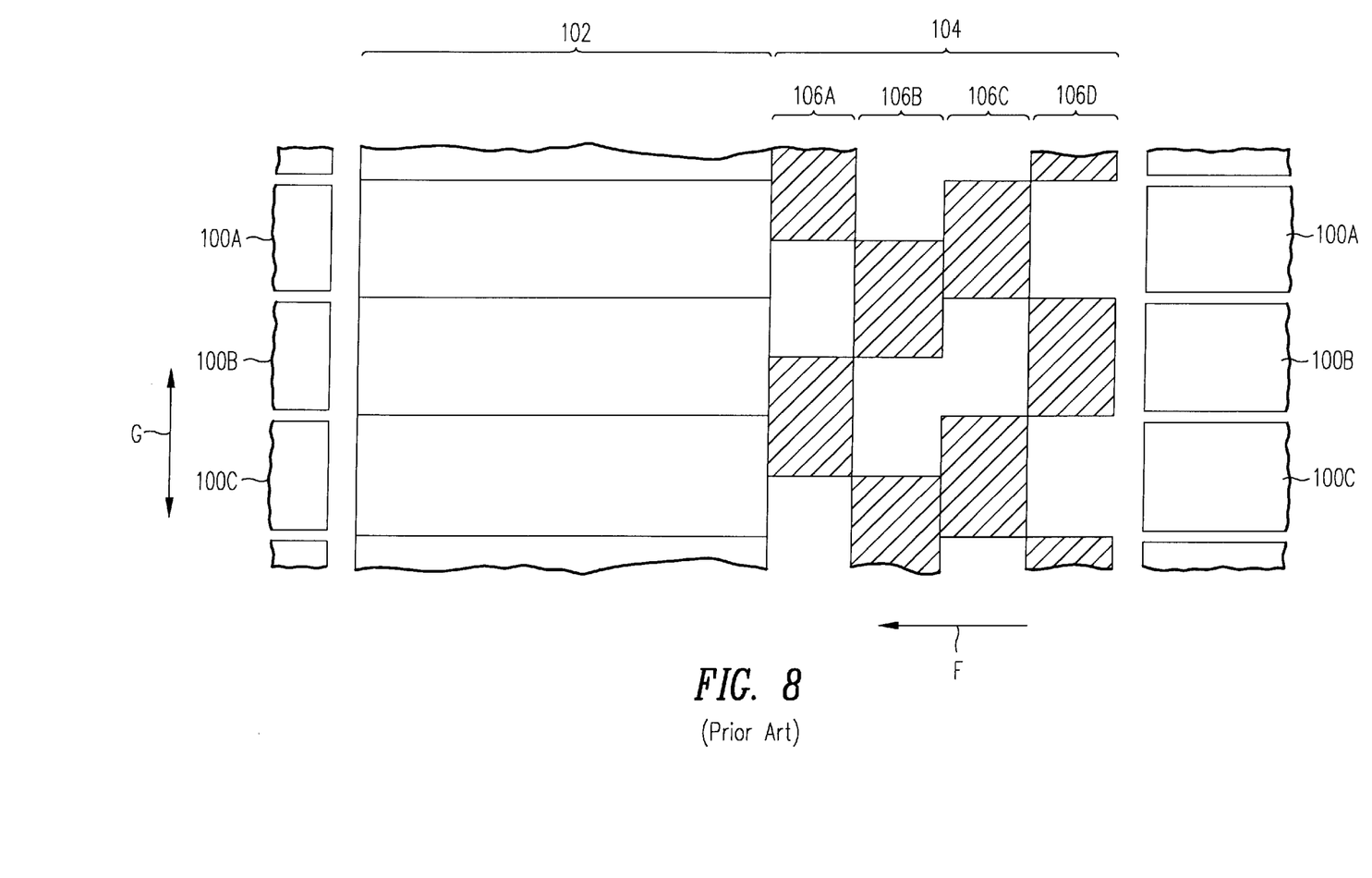
FIG. 8 is a schematic view showing the identification information recording region and burst pattern recording region formed on the conventional magnetic disk.

FIG. 8 shows part of the identification information and burst patterns recorded on a magnetic disk. In FIG. 8, the magnetic disk rotates in the circumferential direction thereof (the direction in FIG. 8 indicated by arrow F), and a magnetic head (not shown) moves essentially in the radial direction of the magnetic disk (the direction in FIG. 8 indicated by arrow G). A plurality of data tracks 100A, 100B, 100C . . . on which data is recorded is concentrically formed on the magnetic disk. Each data track is partially disconnected in the circumferential direction, and an identification information recording region 102 and a burst pattern recording region 104 are formed in the portions where the data track is disconnected.

Each data track is assigned a track address for identifying each data track, and, in the identification information recording region 102, identification information of a predetermined number of bits representing the track address of each data track by a gray code (cyclic binary code) is recorded in the circumferential direction so as to correspond to each data track. Also, in the burst pattern recording region 104, a plurality of (in FIG. 8, four) burst pattern trains 106A, 106B, 106C, and 106D is recorded, in which areas having a signal recorded therein (shown by hatching in FIG. 8) are respectively arranged in the radial direction.

To position the magnetic head at a predetermined data track, the magnetic disk is rotated and the magnetic head is moved essentially in the radial direction of the magnetic disk, as described above, and, each time the identification information recording region 102 is made to face the magnetic head by the rotation of the magnetic disk, the track address of the data track faced by the magnetic head is calculated as the current magnetic head position based on the identification information read signal output by the magnetic head. In the identification information, as more specifically shown in FIG. 9(A), the recording length for 1-bit data ($L_0$ in FIG. 9(A)) is predetermined, and the identification information is recorded so that the portion in the recording extent having length $L_0$ corresponding to each bit is magnetized to N or S in accordance with whether the value of each bit of the gray code representing the track address is "0" or "1".

Figures 9A, 9B:
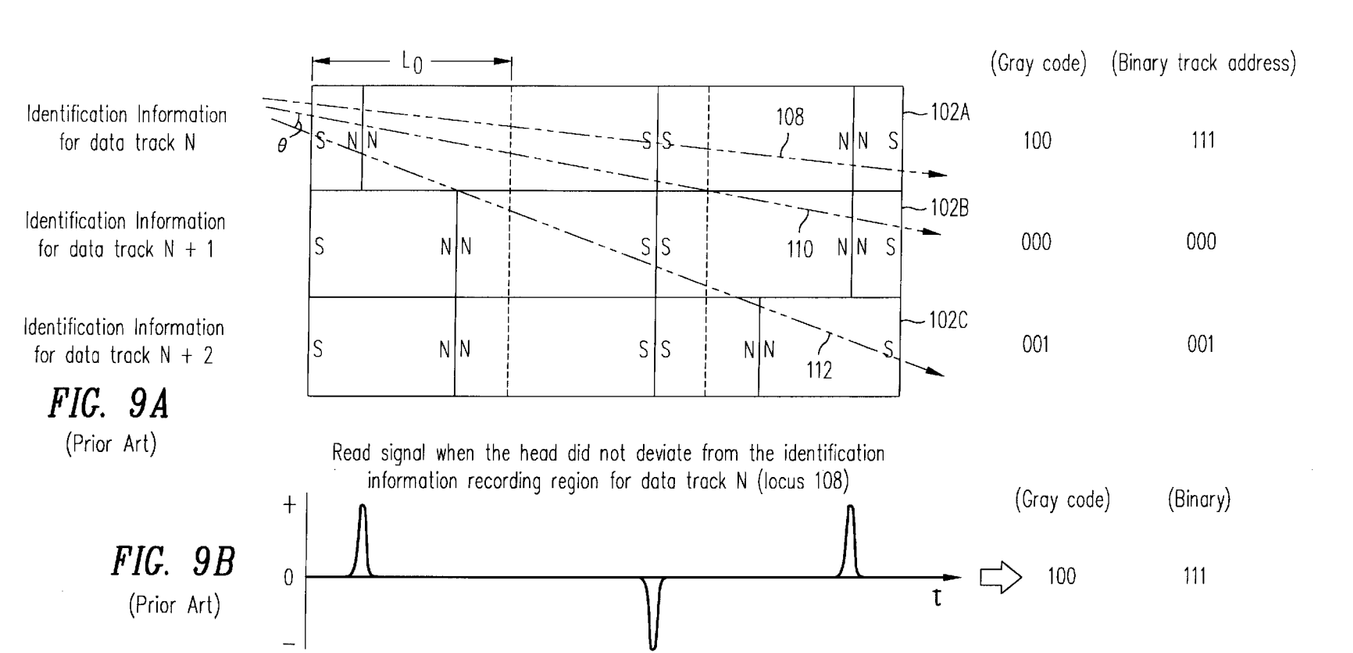
FIG. 9(A) is a conceptual view showing the identification information recording region for explaining the problems of the prior art.
FIG. 9(B) is a drawing showing the read signal which is output when the magnetic head moves along locus 108 shown in FIG. 9(A)

For instance, if the magnetic head passes the identification information recording region 102A for data track N shown in FIG. 9(A), a signal in which a pulse occurs at the portions magnetized to N or S, as shown in FIG. 9(B), is output by the magnetic head as an identification information read signal. However, since the magnetic disk is rotating at this point in time and the magnetic head moves essentially in the radial direction of the magnetic disk, the magnetic head actually passes obliquely with respect to the recording direction (the circumferential direction of the magnetic disk) to identification information to be recorded onto the identification recording region 102, as shown by locus 108 in FIG. 9(A). Based on the positioning of the pulses of the identification information read signal, the value of the gray code as identification information recorded in the identification information recording region 102 can be determined, and a track address can be obtained by converting the thus-determined gray code to a binary code.

Incidentally, since identification information is represented by gray code, the values of the respective bits of the identification information of adjacent data tracks are equal except for a predetermined bit. Consequently, as shown in FIG. 9(A) as locus 110, even if the magnetic head passes so as to span the identification information recording regions (in FIG. 9(A), recording regions 102A and 102B) of two adjacent data tracks, the identification information read signal output by the magnetic head corresponds to either of the identification information of the two data tracks (for instance, a gray code "100" corresponding to data track N is output if the magnetic head passes along locus 110). Thus, even if it is taken into consideration that there are two directions in which the magnetic head moves in a seek operation (from the outer peripheral side to the inner peripheral side of the magnetic disk, or from the inner peripheral side to the outer peripheral side), the data track at which the magnetic head is currently positioned can be determined with an error width of one track ±1 track (a total of three tracks in width) based on the identification information read by the magnetic head. Then, according to the deviation of the determined data track from the target data track, the movement of the magnetic head is controlled so that the magnetic head faces the target data track.

When it is determined that the magnetic head has faced the target data track, then, based on a plurality of signals obtained when the plurality of burst pattern trains in the burst pattern recording region 104 is read by the magnetic head, respectively, a positioning detection signal having a level linearly varying according to the head position is generated, and, based on the positioning detection signal, the magnetic head is positioned so that the center of the magnetic head gap is positioned at the width center of the target data track.

Regarding the magnetic disk, there is a constant demand for an increase in the storage capacity and the shortening of the access time for recording or reading information. The increase in the storage capacity can be attained by decreasing the data track spacing and increasing the information recording density, while the shortening of the access time can be attained by moving the magnetic head at a high speed in the seek operation.

However, this causes a large angle θ (refer to FIG. 9(A)) to be formed between the locus drawn by the magnetic head passing over the identification information recording region 102 and the recording direction of identification information onto the identification information recording region 102 (the circumferential direction of the magnetic disk), which produces a problem in that identification information cannot be correctly read by the magnetic head and hence the magnetic head position cannot be accurately determined.

Figure 9C:
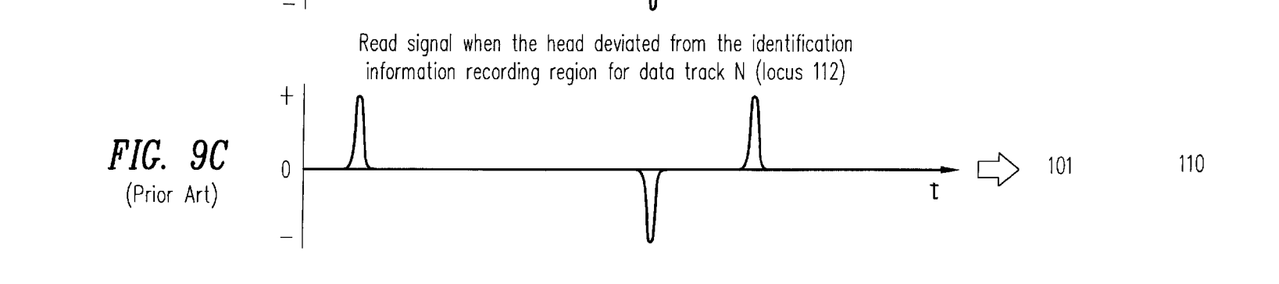
FIG. 9(C) is a drawing showing the read signal which is output when the magnetic head moves along locus 112 shown in FIG. 9(A).

By way of example, if the magnetic head passes over data tracks N, N+1, N+2 so as to span the identification information recording regions 102A to 102C for data track N to data track N+2 as locus 112 (FIG. 9(A)) and identification information read signal as shown in FIG. 9(C) is output, the gray code represented by this signal is "101", and, by converting this to binary, "110" which is different from the track address of any of data track N to data track N+2 is obtained, a misconception of magnetic head positioning occurs.

More accurately, if it is assumed that the number of bits of identification information is n, this misconception of magnetic head positioning occurs in the event that, when the magnetic disk is rotated and the magnetic head is moved in the radial direction of the magnetic disk, the relative position between the magnetic head and the magnetic disk changes by one or more track widths in the radial direction of the magnetic disk while the relative position changes by the recording length of identification information of n−1 bits in the circumferential direction of the magnetic disk. In this case, depending on the positional relationship between the magnetic head and the identification information recording regions, the magnetic head passes so as to span three or more data tracks as shown in FIG. 9(A) as locus 112, and thus an identification information read error and misconception of magnetic head positioning occur.

SUMMARY OF THE INVENTION

The present invention was made in view of the above facts, and it is an object of the present invention to obtain an information recording medium which enables the head position to be determined without an error.

It is also an object of the present invention to obtain a method for generating head positioning identification information which can generate identification information enabling head positioning to be determined without an error.

It is also an object of the present invention to obtain a method for determining head positioning which can determine head positioning without an error.

It is also an object of the present invention to obtain an information recording and reading apparatus which can determine head positioning without an error and which can achieve an increase in the density of information recording on an information recording medium and the shortening of the seek time.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

The information recording medium related to the invention is an information recording medium shaped in the form of a disk and having a plurality of data tracks concentrically arranged thereon, wherein a head having at least the function of reading the signals recorded on the data tracks and moving essentially in the radial direction of the disk is caused to face a predetermined data track while the information recording medium is rotated, whereby the predetermined data track is accessed by the head, characterized in that identification information is recorded in the circumferential direction of the disk so as to correspond to each data track, the identification information consisting of a first gray code which is different among a plurality of blocks each consisting of a plurality of data tracks continuously arranged in the radial direction of the disk, and a second gray code represented by a value which is different between data tracks contiguous in the radial direction of the disk and circulates for each plurality of blocks continuous in the radial direction of the disk.

The method for generating head positioning identification information related to the invention is a method for generating head positioning identification information wherein, for rotating an information recording medium shaped in the form of a disk and having a plurality of data tracks concentrically arranged thereon, moving a head having at least the function of reading the signals recorded on the data tracks essentially in the radial direction of the disk, and determining the positioning of the head to cause the head to face a predetermined data track, identification information is generated which is recorded in the circumferential direction of the disk so as to correspond to each data track, comprising: dividing the identification information into a first gray code and a second gray code, setting the first gray code for each block so that it is different among a plurality of blocks each consisting of a plurality of data tracks, the number of which is equal to or greater than the number of data tracks existing in the extent corresponding to the amount of movement made by the head in the radial direction of the disk while the information recording medium rotates by an amount of rotation corresponding to the recording length of the first gray code in the circumferential direction, setting the second gray code for each data track so that it is represented by a value which is different between data tracks contiguous in the radial direction of the disk and circulates for each three or more blocks continuous in the radial direction of the disk, and combining the first and second gray codes set above to generate identification information for each data track.

The method for determining head positioning related to the invention comprises: rotating an information recording medium shaped in the form of a disk, having a plurality of data tracks concentrically arranged thereon, and having identification information recorded in the circumferential direction of the disk so as to correspond to each data track, the identification information consisting of a first gray code which is different among a plurality of blocks each consisting of a plurality of data tracks continuously arranged in the radial direction of the disk, and a second gray code represented by a value which is different between data tracks contiguous in the radial direction of the disk and circulates for each plurality of blocks continuous in the radial direction of the disk; moving a head having at least the function of reading the signals recorded on the data tracks essentially in the radial direction of the disk; and determining a head position in the radial direction of the disk based on the combination of the first gray code and the second gray code of the identification information read by the head.

The information recording and reading apparatus related to the invention comprises: an information recording medium shaped in the form of a disk, having a plurality of data tracks concentrically arranged thereon, and having identification information recorded in the circumferential direction of the disk so as to correspond to each data track, the identification information consisting of a first gray code which is different among a plurality of blocks each consisting of a plurality of data tracks continuously arranged in the radial direction of the disk, and a second gray code represented by a value which is different between data tracks contiguous in the radial direction of the disk and circulates for each plurality of blocks continuous in the radial direction of the disk; a head having at least the function of reading the signals recorded on the data tracks; a rotation means for rotating the information recording medium; a movement means for moving the head essentially in the radial direction of the disk; a determination means for determining a head position in the radial direction of the disk based on the combination of the first gray code and the second gray code of the identification information read by the head; and a control means for controlling the movement means based on the head positioning determined by the determination means so that the head moves to a position at which the head faces a predetermined data track.

In the invention, on an information recording medium shaped in the form of a disk and having a plurality of data tracks concentrically arranged thereon, identification information is recorded in the circumferential direction of the disk so as to correspond to each data track, which identification information consists of a first gray code which is different among a plurality of blocks each consisting of a plurality of data tracks continuously arranged in the radial direction of the disk, and a second gray code represented by a value which is different between data tracks contiguous in the radial direction of the disk and circulates for each plurality of blocks continuous in the radial direction of the disk.

If, to position a head having at least the function of reading the signals recorded on data tracks at a predetermined data track of the information recording medium, the information recording medium is rotated and the head is moved essentially in the radial direction of the disk, the head will pass the identification information recording region in the direction intersecting with the radial direction and the circumferential direction of the disk.

However, in the present invention, since the first gray codes of the respective plurality of data tracks constituting a single block are made equal, if the amount of change in the relative positioning between the head and the information recording medium in the radial direction of the information recording medium while the relative positioning changes by the recording length of the first gray code in the circumferential direction of the information recording medium is equal to or smaller than the total of the widths of the plurality of data tracks making up the single block (hereinafter referred to as the block width), the rough positioning of the head in the radial direction of the disk can be definitely determined in an error width of one block ±1 block (a total of three blocks in width) based on the first gray code read by the head.

Figure 1:
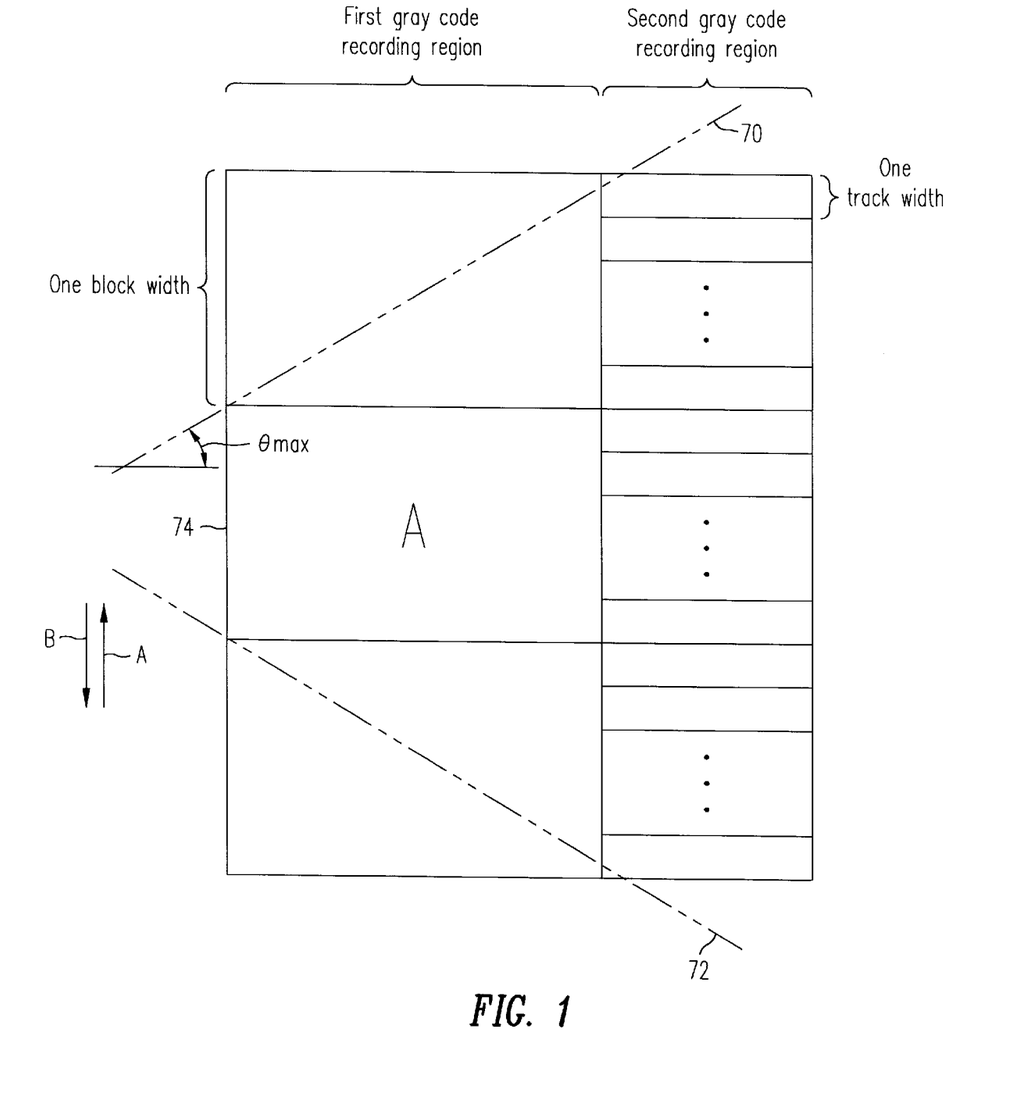
FIG. 1 is a conceptual view for explaining the error width of the head position determination by the first gray code as an action of the present invention.

To further explain the error width with reference to FIG. 1, if the amount of change in the relative positioning between the head and the information recording medium in the radial direction of the information recording medium while the relative positioning changes by the recording length of the first gray code in the circumferential direction of the information recording medium is one block width or less, the maximum value of the angle formed between locus 70 of the head passing over the identification information recording region and the recording direction of identification information becomes $\theta_{max}$ as shown in FIG. 1.

Now, for a first gray code recording region 74 in which a first gray code "A" is recorded for convenience, examination is made of the range of the loci of the head in which the first gray code read by the head likely becomes "A". Since the value of the respective bits of the first gray codes of adjacent blocks are equal except for a predetermined bit, if the head moves from the left side to the right side in FIG. 1, the range of the loci becomes maximum when only the value of the most significant bit is different from the adjacent blocks. The locus 70 corresponds to the boundary of the locus range if the head moves in the direction shown by arrow A in FIG. 1.

In addition, it is not fixed whether the head moves from the outer peripheral side to the inner peripheral side or from the inner peripheral side to the outer peripheral side in a seek operation and, thus, if this is taken into consideration, the boundary of the locus range becomes locus 72 when the head moves in the direction shown by arrow B in FIG. 1 in a manner similar to the above. As is obvious from FIG. 1, at the time when the head has passed the first gray code recording region, the width of the range bounded by loci 70 and 72 (the range in which the first gray code read by the head is likely to become "A") is about three blocks. Consequently, if the first gray code read by the head is "A," it can be determined that the head has surely passed the range of three block widths having the block assigned "A" as the first gray code as the center and bounded by the loci 70 and 72.

Also, since the rough positioning of the head can surely be determined based on the first gray code as described above, in the present invention, the second gray code is represented by a value which is different between adjacent data tracks and circulates for each plurality of blocks continuous in the radial direction of the disk. The plurality of blocks is preferably made up of blocks the number of which is equal to or greater than the error width for the first gray code. Accordingly, if the amount of change in the relative positioning between the head and the information recording medium in the radial direction of the information recording medium while the relative positioning changes by the recording length of the second gray code along the circumferential direction of the information recording medium is equal to or smaller than the width of a single data track, the head positioning in the region made up of the plurality of blocks can be reliably determined with an error width of one track ±1 track based on the second gray code read by the head.

Further, regarding the second gray code, the allowable maximum value of the amount of change in the relative positioning between the head and the information recording medium in the radial direction of the information recording medium is equal to the conventional one (equal to or smaller than the width of a single data track), but, since the second gray code represents a value which circulates for each plurality of blocks, as described above, the number of necessary bits is small compared to the conventional identification information representing the track address itself, and the recording length of the second gray code may thus be short compared to the conventional identification information. Accordingly, the allowable maximum value ($\theta_{max}$) of angle $\theta$ (refer to FIG. 9(A)) formed by the locus drawn by the head passing the second gray code recording region, the longitudinal direction of the second gray code recording region (the circumferential direction of the information recording medium), obviously becomes larger as compared with the conventional one.

As described above, in the present invention, identification information is divided into a first gray code and a second gray code, and the rough positioning of the head can be reliably determined based on the first gray code read by the head, while at which portion of a region consisting of a plurality of blocks the head is positioned can reliably be determined based on the second gray code read by the head. Thus, even if the head passes so as to span the identification information recording regions of, for instance, three or more data tracks, the head positioning can surely be determined based on the combination of the first gray code and the second gray code.

Since, in the invention, identification information consisting of the first gray code and the second gray code is recorded on the information recording medium, the head positioning can be determined with no error even if the data tracks are formed at a fine spacing to increase the information storage capacity of the information recording medium or the head is moved at high speed to shorten the seek time.

In the invention, identification information is divided into a first gray code and a second gray code, and the first gray code is set for each block so that it differs for each plurality of blocks each consisting of a plurality of data tracks the number of which is equal to or greater than the number of the data tracks existing in the extent corresponding to the amount of movement made by the head in the radial direction of the disk while the information recording medium rotates by an amount of rotation corresponding to the recording length of the first gray code of the identification information in the circumferential direction. The first gray code set in this way is recorded on the information recording medium and the amount of movement made by the head in the radial direction of the disk while the information recording medium rotates by an amount of rotation corresponding to the recording length of the first gray code of the identification information in the circumferential direction is equal to or smaller than one block width, as described above, and thus the rough head positioning can be reliably determined with an error width of one block ±1 block based on the first gray code read by the head.

Further, in the invention, the second gray code is set for each data track so that it is represented by a value which differs between data tracks contiguous in the radial direction of the disk and circulates for each three or more blocks continuous in the radial direction of the disk. The three blocks correspond to the error width of the head positioning determined by the first gray code, and by setting the second gray code so as to be represented by a value which circulates for each block the number of which is not smaller than three and as small as possible, and recording it on the information recording medium. The head positioning in the region consisting of a plurality of blocks can reliably be determined with an error width of one track ±1 track based on the second gray code read by the head. In addition, by making the number of the bits of the second gray code as small as possible, the allowable maximum value ($\theta_{max}$) of angle $\theta$ formed by the locus of the head passing the second gray code recording region with the longitudinal direction of the second gray code recording region can be made large.

Since, in the invention, the identification information of each data track is generated by combining the first gray code and the second gray code which were set as described above, identification information enabling the head positioning to be determined with no error can be generated, even if the identification information is recorded on an information recording medium on which data tracks are formed at a fine spacing, or the head is moved at high speed essentially in the radial direction of the disk in a seek operation.

In the invention, an information recording medium is used which is shaped in the form of a disk, has a plurality of data tracks concentrically arranged thereon, and has identification information recorded in the circumferential direction of the disk so as to correspond to each data track, the identification information consisting of a first gray code which differs among a plurality of blocks each consisting of a plurality of data tracks continuously arranged in the radial direction of the disk, and a second gray code represented by a value which differs between data tracks contiguous in the radial direction of the disk and circulates for each plurality of blocks continuous in the radial direction of the disk.

Further, by rotating the information recording medium, moving a head having at least the function of reading the signals recorded on the data tracks essentially in the radial direction of the disk, and determining the head positioning in the radial direction of the disk based on the combination of the first and second gray codes of the identification information read by the head. This enables the head positioning to be determined with no error, as in the invention set forth in claim 1, even if data tracks are formed at a fine spacing on the information recording medium to increase the information storage capacity of the information recording medium, or the head is moved at high speed to shorten the seek time.

The invention comprises an information recording medium which is shaped in the form of a disk, has a plurality of data tracks concentrically arranged thereon, and has identification information recorded in the circumferential direction of the disk so as to correspond to each data track, the identification information consisting of a first gray code which differs among a plurality of blocks each consisting of a plurality of data tracks continuously arranged in the radial direction of the disk, and a second gray code represented by a value which differs between data tracks contiguous in the radial direction of the disk and circulates for each plurality of blocks continuous in the radial direction of the disk, and further comprises a head having at least the function of reading the signals recorded on the data tracks.

In addition, the information recording medium is rotated by a rotation means, the head is moved by a movement means essentially in the radial direction of the disk, and in a determination means, the head positioning in the radial direction of the disk is determined based on the combination of the first and second gray codes of the identification information read by the head, and in a control means, the movement means is controlled based on the head position determined by the determination means so that the head moves to a position at which the head faces a predetermined data track. This allows the head positioning to be determined with no error even if data tracks are formed at a fine spacing on the information recording medium or the head is moved at high speed, which enables the accomplishment of the increase in the density of information recording onto the information recording medium and the shortening of the seek time.

EMBODIMENT

Figure 2:
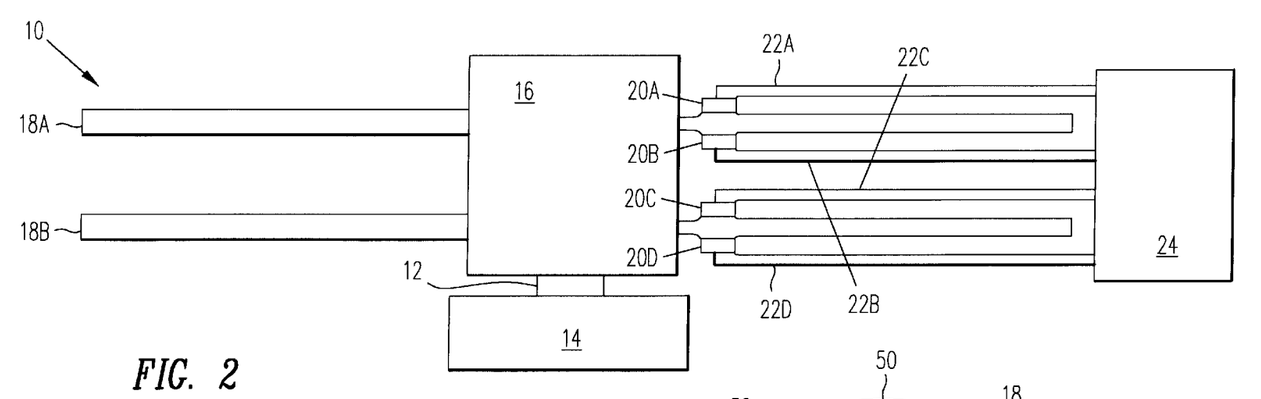
FIG. 2 is a schematic view of the hard disk device related to the present embodiment.

The embodiment of the present invention is described below in detail with reference to the drawings. Although numbers giving no hindrance to the present invention are used in the following description, the present invention is not limited to the values described below. In FIG. 2, a hard disk device 10 related to the present invention is shown. The hard disk device 10 includes a driving device 14 for rotating a shaft 12 at high speed when power is turned on. On the shaft 12, a cylindrical support 16 is provided so that the axes of both coincide, and to the outer periphery of the support 16, a plurality of (in FIG. 2, two) disks 18A and 18B as a information recording medium in the present invention are installed at a predetermined interval.

The disks 18A and 18B are shaped in the form of a disk having a predetermined thickness, and they are respectively formed of a hard material and have a magnetic material coated on both surfaces thereof, whereby both surfaces are used as recording surfaces. In the central portions of the disks 18A and 18B, a hole is made which has a diameter substantially the same as the outer diameter of the support 16. The support 16 is inserted into the hole, and the disks 18A and 18B are installed on the outer periphery of the support 16. Accordingly, when the hard disk 10 power is turned on and the shaft 12 is rotated by the driving device 14, the disks 18A and 18B are rotated integrally with the support 16. Thus, the driving device 14 corresponds to the rotation means of the present invention.

Figure 3:
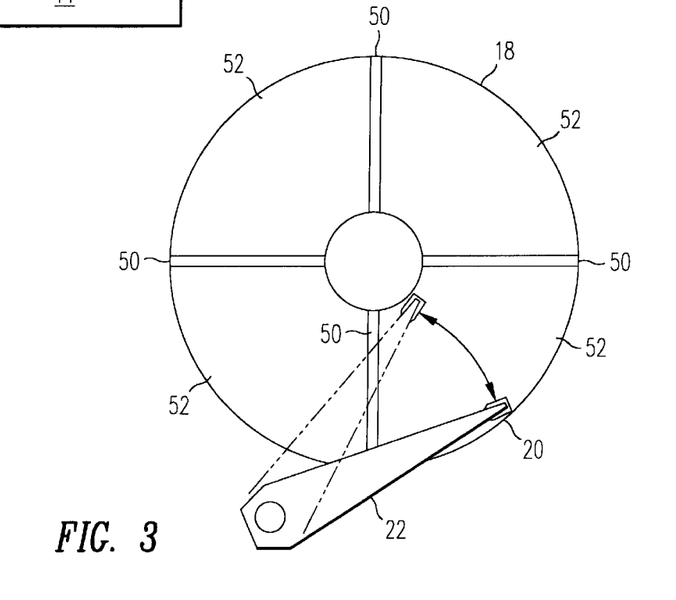
FIG. 3 is a plan view of the disk showing the positioning detection information recording regions.
Figure 4:
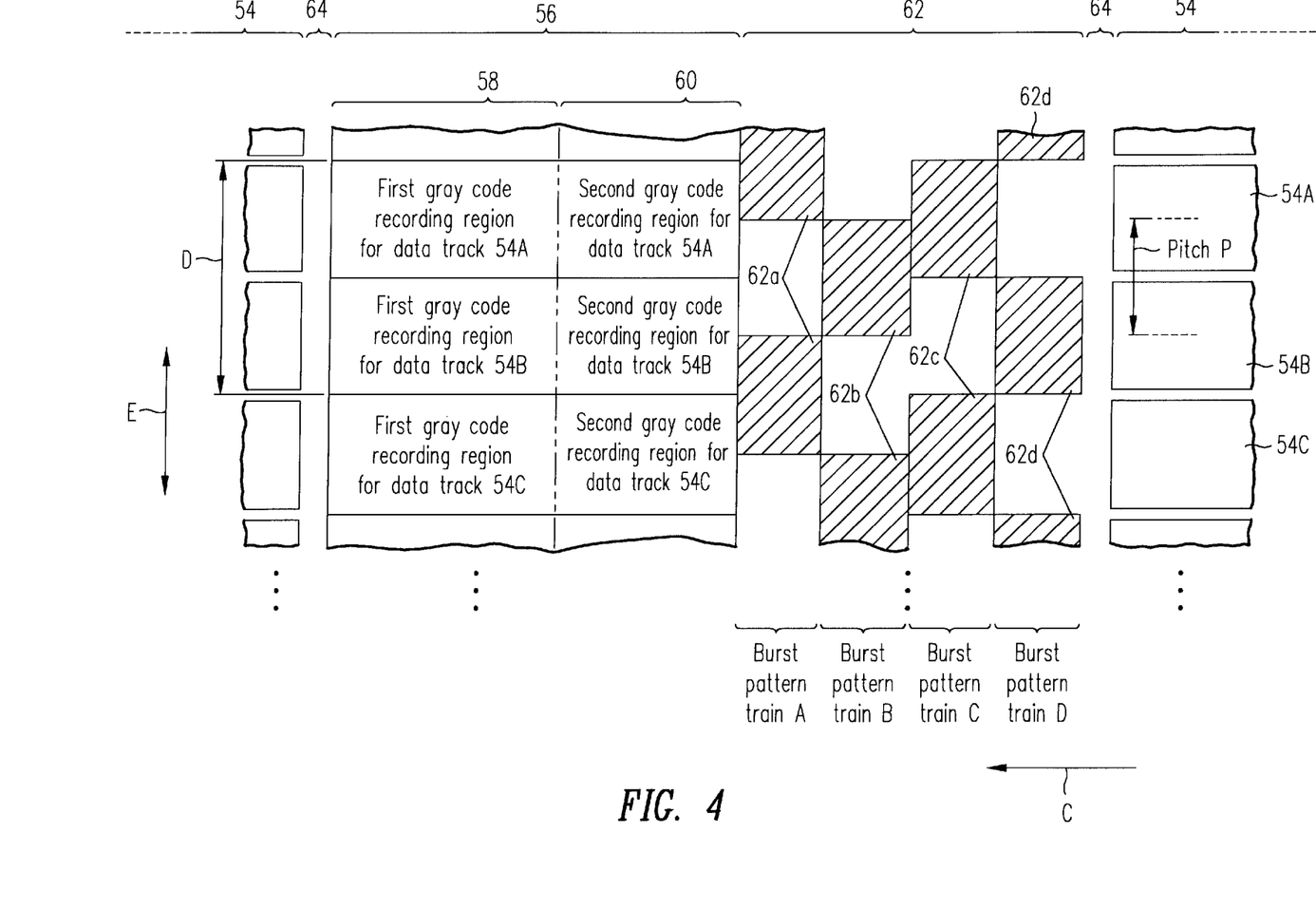
FIG. 4 is a plan view showing data tracks, and track identification information and burst pattern recorded in the positioning detection information recording region.

On the recording surface of each of the disks 18A and 18B, as shown in FIG. 3, a plurality of positioning detection information recording regions 50 is, on the one hand, radially formed in the radial direction of the disk 18, and the remaining regions constitute data track regions 52. Part of the positioning detection information recording regions 50 and the data track regions 52 are shown in FIG. 4. In the data track regions 52, a plurality of data tracks is concentrically formed at pitch P, part of which data tracks 54A, 54B and 54C are shown in FIG. 4. On each data track 54, information is written by a head, to be described later, in the circumferential direction of the disk 18 (the direction of arrow C in FIG. 4).

On the other hand, in the positioning detection information recording regions 50, there are provided a track identification information recording region 56 in which track identification information is recorded so as to correspond to each data track 54 and a burst pattern recording region 62. The track identification information consists of a first gray code and a second gray code related to the present invention. In the track identification information recording region 56, there are provided a first gray code recording region 58 in which the first gray code is recorded and a second gray code recording region 60 in which the second gray code is recorded.

In the hard disk device 10 related to the present invention, the rotation speed of the disk 18, the spacing of the data tracks 54, and the maximum value of the speed of movement of a magnetic head 20 are determined so that, when the disk 18 is rotated and the magnetic head is moved essentially in the radial direction of the disk 18 (the direction of arrow E in FIG. 4), the amount of movement made by the magnetic head 20 in the radial direction of the disk 18 while the first gray code recorded in the first gray code recording region 58 is read by the magnetic head 20 is equal to or smaller than the width dimension of the track identification information recording region 56 corresponding to two data tracks 54 contiguous in the radial direction of the disk 18 (in FIG. 4, width D or two-track width).

In consequence, the number of data tracks 54 existing in the extent corresponding to the amount of movement made by the magnetic head 20 in the radial direction of the disk 18 while the disk 18 rotates by a rotation amount corresponding to the recording length of the first gray code in the circumferential direction is "2," and, in this embodiment, the number of data tracks 54 making up a block is set to "2," and the first gray code corresponding to each data track 54 is determined by using n-1 bit data obtained by removing the least significant bit from the track address of each data track 54 represented by n-bit binary data and converting this data to a gray code (this gray code also having n-1 bits).

Figure 5:
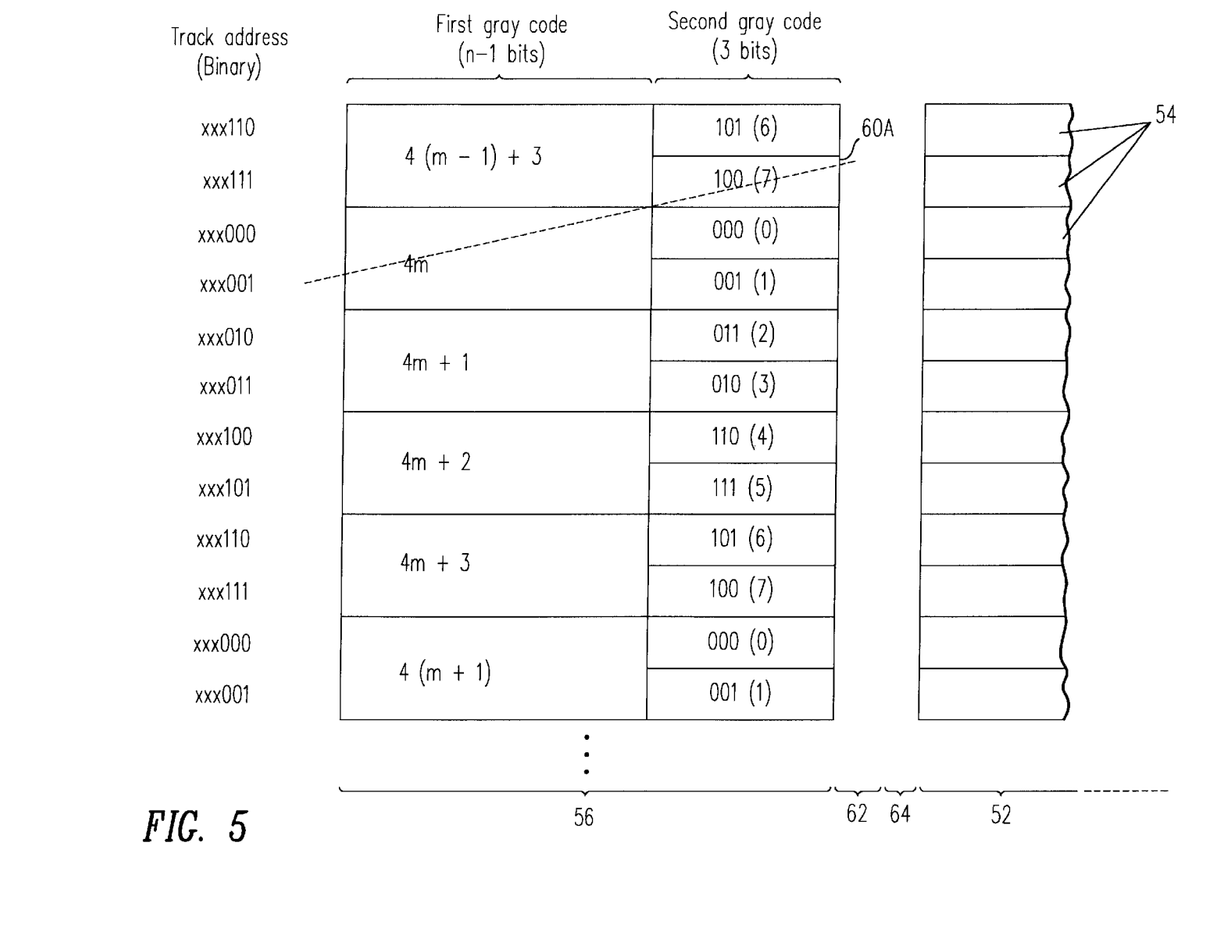
FIG. 5 is a conceptual view showing a specific example of the gray codes which are recorded in the first gray code recording region and the second gray code recording region, respectively.

Thus, the value of the first gray code of each data track 54 differs for each plurality of blocks each consisting of two data tracks 54 contiguous in the radial direction of each disk (the direction of arrow E in FIG. 4), as shown in FIG. 5. The burst pattern is omitted in FIG. 5.

Further, according to the foregoing, the error width of the magnetic head which can be determined by the first gray code is one block ±1 block, which corresponds to six data tracks, and the second gray code need only be represented by a value which differs at least each six data tracks. However, at least three bits are required to express six numerics while $2^3=8$ numerics can be expressed by three bits. Thus, in this embodiment, the second gray code is made up of three bits and set to a value which differs between data tracks 54 contiguous in the radial direction of the disk 18 and circulates for each four blocks, or every eight data tracks.

In addition, in accordance with the present invention, the allowable maximum value of the amount of movement of the magnetic head 20 essentially in the radial direction of the disk 18 during the reading of the second gray code by the magnetic head 20 is one track width as in the prior art, but the number of the bits of the second gray code is three which is obviously small compared to n, which is the number of bits of the track address for identifying each data track 54 (the number of the bits of the gray code as track identification information in the prior art is also n), and thus the recording length of the second gray code is obviously large compared to the track identification information in the prior art. Accordingly, the amount of movement of the magnetic head 20 essentially in the radial direction of the disk 18 during the reading of the second gray code by the magnetic head 20 never exceeds one track width.

On the one hand, as shown in FIG. 9(A), the first and second gray codes are magnetically recorded so that the portion is magnetized to N or S in the recording range having length $L_0$ corresponding to each bit differs according to the value of each bit (this also applies to data to be recorded in data tracks 54).

On the other hand, the burst pattern formed in the burst pattern recording region 62 consists of four burst pattern trains (burst pattern trains A to D) each having areas in which a signal is recorded (portions shown by hatching in FIG. 4) in the direction in which data tracks 54 are arranged, or the radial direction of the disk 18, as shown in FIG. 4. The size of each signal recording area constituting each burst pattern train in the radial direction of the disk 18 and the spacing between adjacent areas have a length equal to pitch P of the respective data tracks 54.

The signal recording area 62a of burst pattern train A and the signal recording area 62b of burst pattern train B are staggered in the radial direction of the disk 18, and the side at both edges of each area in the radial direction of the disk corresponds to the center of the width of the data track 54, and burst pattern trains A and B are formed by recording a signal in each area. Further, the signal recording area 62c of burst pattern train C and the signal recording area 62d of burst pattern train D are staggered in the radial direction of the disk 18, and the side at both edges of each area in the radial direction of the disk corresponds to the boundary between adjacent data tracks, and burst pattern trains C and D are formed by recording a signal in each area.

In addition, between the data track regions 52 and the position detection information recording regions 50, there are provided silent regions 64 for representing the beginning and the end of the positioning detection information recording regions 50. When the magnetic head 20 passes this silent region 64, a state continues for about 1 $\mu$s in which no signal is output.

Further, as shown in FIG. 2, the hard disk device 10 includes magnetic heads 20A to 20D as the head of the present invention, which are provided so as to correspond to the recording surfaces of each of the disks 18A and 18B. Each magnetic head 20A to 20D comprises a read element (not shown) in which an MR element is used to read information, and a write element (not shown) in which information is written by means of a coil. The magnetic heads 20A to 20D are installed on the distal end of access arms 22A to 22D, respectively, and held at a position somewhat apart, (for instance, about 0.1 to 0.2 microns) from the corresponding recording surfaces of the disks 18A and 18B. Attached to a driving device 24 are the ends of the access arms 22A to 22D opposite the sides on which the magnetic heads 20 are installed.

The driving device 24 includes a voice coil motor 44 (refer to FIG. 6) provided so as to correspond to the access arms 22A to 22D for moving the respective access arms and, when the voice coil motor 44 is driven by a controller to be described later, the access arms are moved so that the magnetic heads 20A to 20D move essentially in the radial direction of the disks 18A and 18B. By this, the magnetic heads 20A to 20D are caused to face predetermined portions on the recording surfaces of the disks 18A to 18B. In addition, the voice coil motor 44 constitutes the movement means of the present invention.

Figure 6:
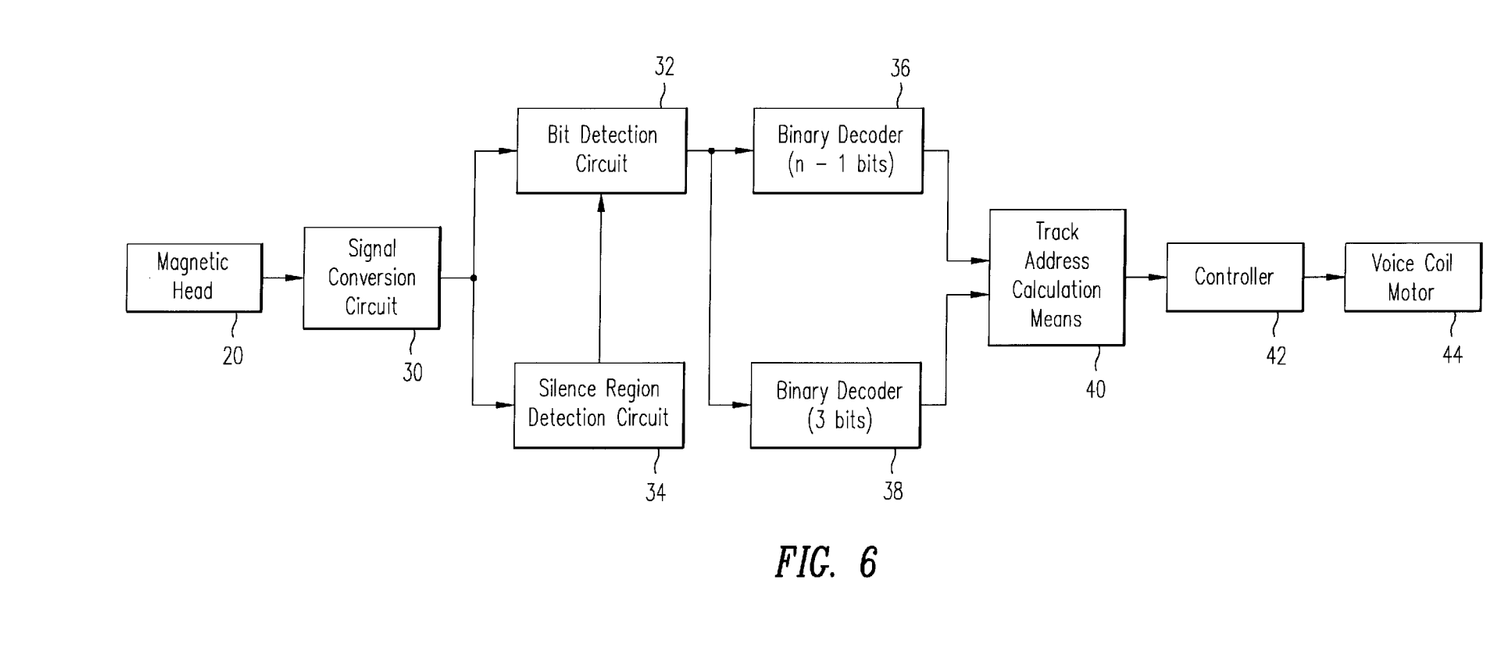
FIG. 6 is a block diagram showing the schematic construction of the magnetic head and the surrounding of the controller for controlling the movement of the head.

The respective magnetic heads 20 are connected to the circuits as shown in FIG. 6. That is, the output terminal of the magnetic head 20 is connected to the input terminal of a signal conversion circuit 30. As described above, the first and second gray codes recorded in the track identification information recording region 56 are recorded so that the portion to be magnetized to N or S in the recording range having a length of $L_0$ corresponding to each bit differs depending on the value of each bit. Thus, when the magnetic head 20 passes the track identification information recording area 56, a signal is generated in which a pulse occurs each time the portion magnetized to N or S faces the read element (FIG. 9(B)). The signal conversion circuit 30 converts the signal output from the magnetic head 20 to a pulse signal and outputs it.

The output terminal of the signal conversion circuit 30 is connected to the input terminal of each of a bit detection circuit 32 and a silent region detection circuit 34. Further, the output terminal of the silent region detection circuit 34 is connected to the input terminal of the bit detection circuit 32. In the silent region detection circuit 34, the level of the pulse signal output from the signal conversion circuit 30 is monitored and, based on whether or not the level of the pulse signal is constant for a certain period of time or longer, it is determined whether or not the magnetic head 20 faces the silent region 64, and the result of the determination is output to the bit detection circuit 32.

While the bit detection circuit 32 is receiving from the silent region detection circuit 34 the determination result of whether the magnetic head does not face the silent region 64, the value of each bit of data such as the first gray code, the second gray code, and the like read by the magnetic head 20 is determined on the basis of the timings for the rising and falling edges of the pulse signal output from the signal conversion circuit 30, and a signal representing the determined value is output.

The output terminal of the bit detection circuit 32 is connected to the input terminals of binary decoders 36 and 38, respectively. The binary decoder 36 converts n−1 bit data which is output by the magnetic head 20 when the magnetic head 20 passes the first gray code recording region 58 and determined in the bit detection circuit 32 for the value of each bit thereof, namely, the first gray code read by the magnetic head 20, to n−1 bit binary data. The binary decoder 38 also converts 3-bit data which is output from the magnetic head 20 when the magnetic head 20 passes the second gray code recording region 60 and determined in the bit detection circuit 32 for the value of each bit thereof, namely, the second gray code read by the magnetic head 20, to 3-bit binary data.

The outputs of the binary decoders 36 and 38 are connected to the input terminals of a track address calculation means 40. The track address calculation means 40 corresponds to the determination means of the present invention and, based on the binary data corresponding to the first gray code and the binary data corresponding to the second gray code which are output from the binary decoders 36 and 38, respectively, calculates the track address of the data track 54 currently faced by the magnetic head 20 in a manner to be described later. The output terminal of the track address calculation means 40 is connected to the input terminal of a controller 42 comprising a microprocessing unit and the like, and the track address calculated in the track address calculation means 40 is output to the controller 42.

The controller 42 corresponds to the control means of the present invention, and determines the position of the magnetic head 20 on the basis of the input track address. To move the magnetic head 20 to a desired data track 54, the controller 42 outputs a drive signal for driving the voice coil motor 44. By this, the voice coil motor 44 is driven to move the magnetic head 20 to the desired position.

Now, as the action of the present embodiment, description is made of the seek operation which is performed for positioning the magnetic head 20 at a desired data track 54 of the disk 18 when information is read from the desired data track 54 or information is written to the desired data track 54.

To perform the seek operation, on the one hand, the controller 42 determines in which direction to move the magnetic head 20 (whether from the outer peripheral side to the inner peripheral side of the disk 18, or from the inner peripheral side to the outer peripheral side), based on the track address of an externally instructed data track 54 at which the magnetic head 20 is to be positioned and the previously determined current position of the magnetic head 20. Then, it outputs a drive signal for driving the voice coil motor 44 so that the magnetic head 20 moves in the determined direction. As a result, the access arm 22 is rotated to move the magnetic head 20 in the determined direction essentially in the radial direction of the disk.

On the other hand, since the disk 18 is always rotated by the driving device 14 while hard disk device 10 power is turned on, the magnetic head 20 is caused to repeatedly face the respective regions formed on the disk 18 (in the sequence of data track region 52, silent region 64, positioning detection information recording region 50, silent region 64, data track region 52 . . . ). During this, the signal output from the magnetic head 20 is converted to a pulse signal in the signal conversion circuit 30, and input to the silent region detection circuit 34 and the bit detection circuit 32, respectively.

The bit detection circuit 32 determines whether or not the magnetic head 20 has passed the silent region 64 based on the signal from the silent region detection circuit 34 and, if it determines that the magnetic head 20 has passed the silent region 64, it outputs to the binary decoder 36 the n−1 bit data (first gray code) obtained by determining the value of each bit on the basis of the signal which is input thereafter from the signal conversion circuit 30, and outputs to the binary decoder 38 the 3-bit data (second gray code) obtained on the basis of the signal received from the signal conversion circuit 30.

The binary decoders 36 and 38 respectively convert the first gray code and the second gray code input from the bit detection circuit 32 to binary data, and output the converted binary data to the track address calculation means 40. As described above, consideration is given so that the amount of movement made by the magnetic head 20 in the radial direction of the disk 18 while the disk 18 rotates by an amount of rotation corresponding to the recording length of the first gray code which does not exceed two track widths (one block width), and the amount of movement made by the magnetic head 20 in the radial direction of the disk 18 while the disk rotates by an amount of rotation corresponding to the recording length of the second gray code which does not exceed one track width.

In consequence, the magnetic head 20 never moves so as to span three blocks when reading the first gray code, and the magnetic head 20 never moves so as to span three data tracks 54 when reading the second gray code, so that a gray code which is not pertinent to the current position of the magnetic head 20, for instance, the gray code of a data track 54 existing apart from the current position of the magnetic head 20, is not output by the binary decoders 36 and 38. In the track address calculation means 40, as shown in following Table 1, according to the conversion table which determines the correspondence between the binary data corresponding to the input first gray code, the binary data corresponding to the second gray code, and the track address calculation formula, the track address is calculated using the track address calculation formula corresponding to the binary data corresponding to the input first gray code and the binary data corresponding to the second gray code.

TABLE 1

| Read first gray code (decimal notation) | Read second gray code (decimal notation) | Calculation formula for track address at which head can be determined to be positioned |
|---|---|---|
| 4m | 0 | 4m × 2 |
| 4m | 1 | 4m × 2 + 1 |
| 4m | 2 | 4m × 2 + 2 |
| 4m | 3 | 4m × 2 + 3 |
| 4m | 4 | 4m × 2 + 4 |
| 4m | 5 | 4m × 2 − 3 |
| 4m | 6 | 4m × 2 − 2 |
| 4m | 7 | 4m × 2 − 1 |
| 4m + 1 | 0 | (4m + 1) × 2 − 2 |
| 4m + 1 | 1 | (4m + 1) × 2 − 1 |
| 4m + 1 | 2 | (4m + 1) × 2 |
| 4m + 1 | 3 | (4m + 1) × 2 + 1 |
| 4m + 1 | 4 | (4m + 1) × 2 + 2 |
| 4m + 1 | 5 | (4m + 1) × 2 + 3 |
| 4m + 1 | 6 | (4m + 1) × 2 + 4 |
| 4m + 1 | 7 | (4m + 1) × 2 − 3 |
| 4m + 2 | 0 | (4m + 2) × 2 + 4 |
| 4m + 2 | 1 | (4m + 2) × 2 − 3 |
| 4m + 2 | 2 | (4m + 2) × 2 − 2 |
| 4m + 2 | 3 | (4m + 2) × 2 − 1 |
| 4m + 2 | 4 | (4m + 2) × 2 |
| 4m + 2 | 5 | (4m + 2) × 2 + 1 |
| 4m + 2 | 6 | (4m + 2) × 2 + 2 |
| 4m + 2 | 7 | (4m + 2) × 2 + 3 |
| 4m + 3 | 0 | (4m + 3) × 2 + 2 |
| 4m + 3 | 1 | (4m + 3) × 2 + 3 |
| 4m + 3 | 2 | (4m + 3) × 2 + 4 |
| 4m + 3 | 3 | (4m + 3) × 2 − 3 |
| 4m + 3 | 4 | (4m + 3) × 2 − 2 |
| 4m + 3 | 5 | (4m + 3) × 2 − 1 |
| 4m + 3 | 6 | (4m + 3) × 2 |
| 4m + 3 | 7 | (4m + 3) × 2 + 1 |

Incidentally, the value of m in Table 1 is arbitrary. The conversion table in Table 1 is to obtain the track address of the data track 54 which is estimated to be faced by the magnetic head 20 when the magnetic head 20 has passed the second gray code recording region 60. For instance, if the data converted from the second gray code is "7" (in gray code, "100") when the data converted from the first gray code is "4m", it can be determined that the magnetic head 20 has traced the locus shown by the dashed line in FIG. 5 as an example and finally has passed the second gray code recording region 60A corresponding to the data track 54 of track address "xxx111". Accordingly, by using the calculation formula "4m×2−1" defined in Table 1 as the track address calculation formula for the input of such data as described above, "xxx111" described above is obtained.

In the track address calculation means 40, each time the magnetic head 20 faces the track identification information recording region 56 of the positioning detection information recording region 50 and the binary data corresponding to the first gray code and the binary data corresponding to the second gray code are input, the track address is calculated as described above and output to the controller 42.

In the controller 42, based on the track address corresponding to the current magnetic head 20 which is input from the track address calculation means 40 and the track address of the data track 54 at which the magnetic head 20 is to be positioned, the deviation of the current positioning of the magnetic head 20 from the data track 54 at which the magnetic head 20 is to be positioned is determined and, based on the determined deviation, the driving of the voice coil motor 44 is controlled so that the magnetic head 20 moves to the data track 54 at which it is to be positioned.

Specifically, until the determined deviation becomes equal to or smaller than a predetermined value, the driving of the voice coil motor 44 is controlled so that the magnetic head 20 moves on the disk 18 at a relatively high speed. Further, when the determined deviation becomes equal to or smaller than the predetermined value, the speed of movement of the magnetic head 20 is reduced.

In addition, when the track address input from the track address calculation means 40 coincides with the track address of the data track 54 at which the magnetic head 20 is to be positioned, a positioning detection signal having a level which changes linearly according to the movement of the magnetic head 20 is generated using the four signals output from the magnetic head 20 and corresponding to burst pattern trains A to D recorded in the burst pattern recording region 62, and based on the positioning detection signal level, the magnetic head 20 is positioned so that the center of the write gap of the magnetic head 20 is aligned with the width center of the data track 54 when information is written to the data track 54, while the magnetic head 20 is positioned so that the center of the read gap is aligned with the width center of the data track 54 when data is read from the data track 54. This enables the writing or reading of information to or from the data track 54.

Figure 7:
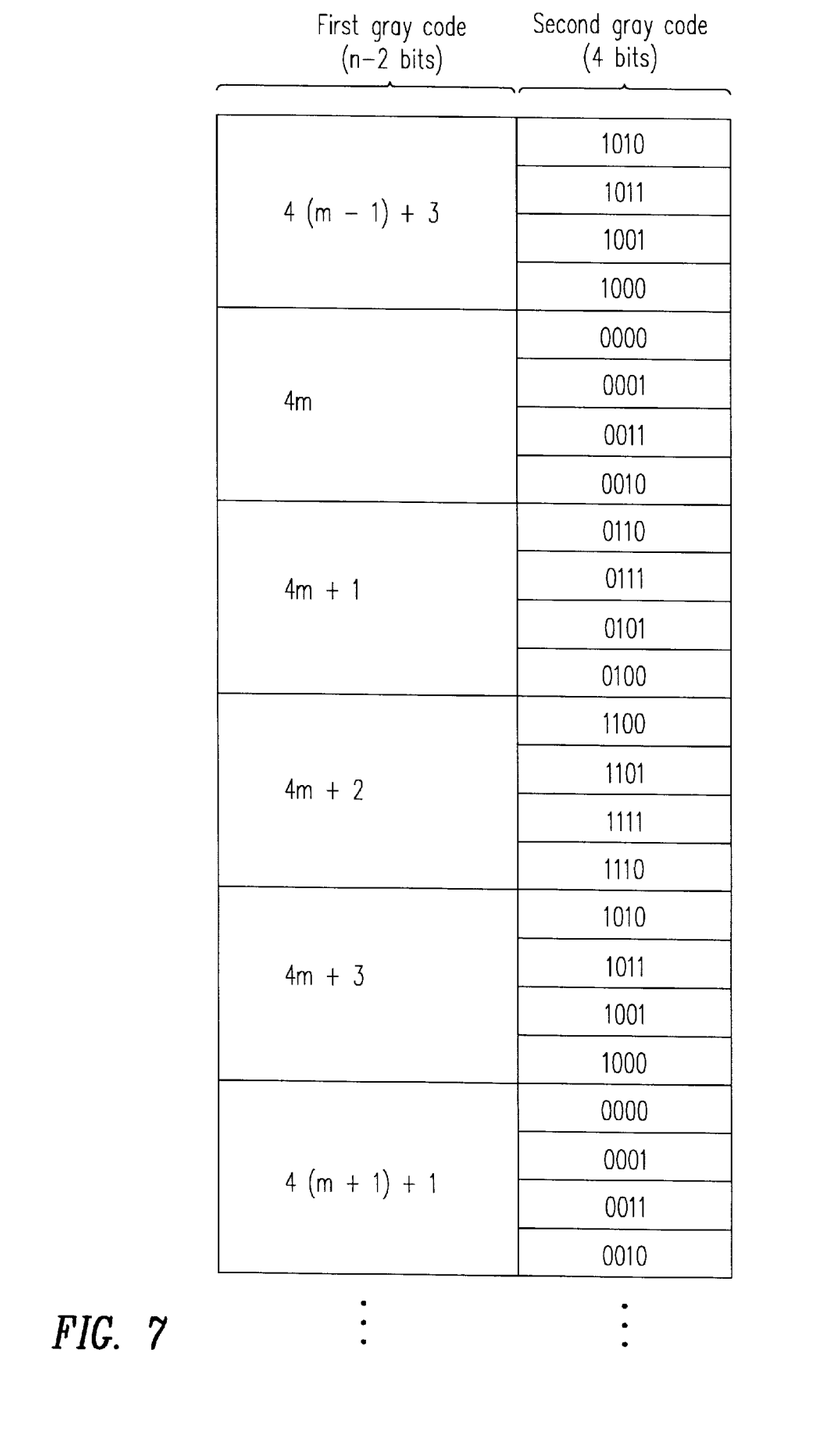
FIG. 7 is a diagram showing, as another example of the first and second gray codes related to the present invention, track identification information for each data track when the first gray code and the second gray code are comprised of n−2 bits and 4 bits, respectively.

The above embodiment is constructed such that, when the disk 18 is rotated and the magnetic head 20 is moved in the radial direction of the disk 18, the amount of movement of the magnetic head 20 in the radial direction of the disk 18 during the reading of the first gray code by the magnetic head 20 is made equal to or smaller than two track widths, and each block is comprised of two data tracks 54, but the present invention is not limited to this. By way of example, the construction may be such that the amount of movement of the magnetic head 20 in the radial direction of the disk 18 during the reading of the first gray code by the magnetic head 20 is made equal to or smaller than four track widths, and a single block is made up of four data tracks 54 as shown in FIG. 7. In this case, the number of bits of the first gray code becomes n−2 and, taking into account the error width (4 tracks×3 blocks=12 track widths) of the positioning of the magnetic head 20 determined by the first gray code, the second gray code can be made up of four bits from $2^3$ (=8)<12<$2^4$ (=16), and can be set to represent a value which circulates for each 16 data tracks.

Although the information recording medium related to the present invention has been described above by taking a magnetic disk as an example, the present invention is not limited to this, but it can be applied to other magnetic recording media such as flexible disks, and other information recording media shaped in the form of a disk and having data tracks concentrically formed thereon, such as optical disks and magneto-optical disks.

As described above, in the information recording medium related to the invention, identification information is recorded in the circumferential direction so as to correspond to each data track, which identification information consists of a first gray code which differs among a plurality of blocks each consisting of a plurality of data tracks continuously arranged in the radial direction of a disk, and a second gray code represented by a value which differs between data tracks contiguous in the radial direction of the disk and circulates for each plurality of blocks continuous in the radial direction of the disk, and thus an excellent advantage is obtained in that head positioning can be determined with no error even if data tracks are formed at a fine spacing to increase the information storage capacity of the information recording medium, or the head is moved at high speed to shorten the seek time.

In the method for generating head positioning identification information related to the invention, identification information is divided into a first gray code and a second gray code, and the first gray code is set for each block so that it differs among a plurality of blocks each consisting of a plurality of data tracks the number of which is equal to or larger than the number of the data tracks existing in the extent corresponding to the amount of movement made by a head in the radial direction of the disk while an information recording medium rotates by an amount of rotation corresponding to the recording length of the first gray code in the circumferential direction of the identification information, while the second gray code is set for each data track so that it is represented by a value which differs between data tracks contiguous in the radial direction of the disk and circulates for each three or more blocks continuous in the radial direction of the disk, and identification information for each data track is generated by combining the first and second gray codes as set above, thereby providing an excellent advantage in that identification information can be generated which enables head positioning to be determined with no error even if the identification information is recorded on an information recording medium on which data tracks are formed at a fine spacing or the head is moved at high speed in the radial direction of the disk in a seek operation.

The method for determining head positioning related to the invention comprises: rotating an information recording medium shaped in the form of a disk, having a plurality of data tracks concentrically arranged thereon, and having identification information recorded in the circumferential direction of the disk so as to correspond to each data track, the identification information consisting of a first gray code which differs among a plurality of blocks each consisting of a plurality of data tracks continuously arranged in the radial direction of the disk, and a second gray code represented by a value which differs between data tracks contiguous in the radial direction of the disk and circulates for each plurality of blocks continuous in the radial direction of the disk; moving a head essentially in the radial direction of the disk; and determining head positioning in the radial direction of the disk based on the combination of the first and second gray codes read by the head, thereby obtaining an excellent advantage in that head positioning can be determined with no error even if data tracks are formed at a fine spacing on the information recording medium to increase the information storage capacity of the information recording medium, or the head is moved at high speed to shorten the seek time.

In the information recording and reading apparatus related to the invention, an information recording medium is rotated which is shaped in the form of a disk, has a plurality of data tracks concentrically arranged thereon, and has identification information recorded in the circumferential direction of the disk so as to correspond to each data track, the identification information consisting of a first gray code which differs among a plurality of blocks each consisting of a plurality of data tracks continuously arranged in the radial direction of the disk, and a second gray code represented by a value which differs between data tracks contiguous in the radial direction of the disk and circulates each plurality of blocks continuous in the radial direction of the disk; a head is moved by a movement means essentially in the radial direction of the disk; head positioning is determined by a determination means based on the combination of the first and second gray codes read by the head; and the head is controlled by a control means so as to move to the position corresponding to a desired data track, thereby obtaining an excellent advantage in that head positioning can be determined with no error, and the increase of the density of information recording on the information recording medium and the shortening of the seek time can be achieved.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

We claim:

1. A magnetic disk drive system comprising:
   a plurality of tracks;
   a plurality of blocks, each block includes a predetermined number of said tracks distinct from the tracks in the other blocks, each block having a unique block identification information, said unique block identification information being stored in each of said predetermined number of said tracks in said each block; and
   a track identification information for each of said tracks, said track identification information comprises a first gray code and a second gray code, said first gray code size being different from said second gray code size.

2. A magnetic disk drive system comprising:
   a disk for storing and retrieving information;
   a plurality of contiguous and concentrically arranged tracks on said disk;
   a plurality of blocks on said disk, each block includes a predetermined number of said tracks distinct from the tracks in the other blocks, each given block having a unique block identification information stored in each of said predetermined number of said tracks in said given block; and
   a track identification information recorded on each of said tracks, said track identification information comprises a first gray code and a second gray code, said first gray code size being different from said second gray code size.

3. A magnetic disk drive system, comprising:
   a disk for storing and retrieving information;
   a plurality of contiguous and concentrically arranged tracks on said disk;
   a plurality of blocks on said disk, each block includes a predetermined number of said tracks distinct from the tracks in the other blocks, each given block having a unique block identification information stored in each of said predetermined number of said tracks in said given block;
   a head for reading information from said tracks during read operations; and
   a track identification information recorded on each of said tracks for identifying each of said tracks during said read operations, said track identification information comprises a first gray code and a second gray code, said first gray code size being different from said second gray code size.

4. In a magnetic disk drive system, comprising:
   a disk for storing and retrieving information, a plurality of contiguous and concentrically arranged tracks on said disk, a plurality of blocks on said disk, each block comprising a predetermined number of said tracks distinct from the tracks in the other blocks, each given block having a unique block identification information stored in each of said predetermined number of said tracks in said given block, a head for reading information from said tracks during read operations, a method of accessing tracks comprising the steps of:
   recording a track identification information on each of said tracks for identifying each of said tracks during said read operations, wherein said track identification information comprises a first gray code and a second gray code, said first gray code size being different from said second gray code size; and
   reading said first gray code and said second gray code during read operations for positioning said head over desired tracks.

* * * * *